United States Patent
Carbune et al.

(10) Patent No.: US 12,192,022 B1
(45) Date of Patent: Jan. 7, 2025

(54) VIDEO CONFERENCE CONTENT AUTO-RETRIEVAL AND FOCUS BASED ON LEARNED RELEVANCE

(71) Applicant: GOOGLE LLC, Mountain View, CA (US)

(72) Inventors: Victor Carbune, Winterthur (CH); Daniel Keysers, Stallikon (CH); Thomas Deselaers, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/592,428

(22) Filed: Feb. 29, 2024

Related U.S. Application Data

(63) Continuation of application No. 17/972,515, filed on Oct. 24, 2022, now Pat. No. 11,956,091, which is a continuation of application No. 16/730,484, filed on Dec. 30, 2019, now Pat. No. 11,483,170.

(51) Int. Cl.
| | | |
|---|---|---|
| G06F 15/16 | (2006.01) | |
| H04L 12/18 | (2006.01) | |
| H04M 3/56 | (2006.01) | |

(52) U.S. Cl.
CPC ...... *H04L 12/1831* (2013.01); *H04L 12/1818* (2013.01); *H04L 12/1822* (2013.01); *H04M 3/566* (2013.01); *H04M 3/568* (2013.01)

(58) Field of Classification Search
CPC ............. H04L 12/1831; H04L 12/1818; H04L 12/1822; H04M 3/566; H04M 3/568
See application file for complete search history.

(56) References Cited

U.S. PATENT DOCUMENTS

| | | | |
|---|---|---|---|
| 10,440,325 B1 | 10/2019 | Boxwell et al. | |
| 11,483,170 B1 * | 10/2022 | Carbune | H04L 12/1822 |
| 11,956,091 B1 * | 4/2024 | Carbune | H04M 3/566 |
| 2014/0108288 A1 | 4/2014 | Calman et al. | |
| 2014/0108557 A1 | 4/2014 | Calman et al. | |
| 2016/0337413 A1 * | 11/2016 | Sallam | G06F 16/433 |
| 2019/0082142 A1 | 3/2019 | Pell | |
| 2019/0260965 A1 | 8/2019 | Morabia et al. | |
| 2020/0273493 A1 | 8/2020 | Huber et al. | |
| 2020/0403817 A1 | 12/2020 | Daredia et al. | |

* cited by examiner

*Primary Examiner* — John B Walsh
(74) *Attorney, Agent, or Firm* — Lowenstein Sandler LLP

(57) ABSTRACT

Systems and methods for video conference content auto-retrieval and focus based on learned relevance is provided. A method may include determining collaborative documents each associated with at least one user participating in a video conference, and providing one or more first inputs to a machine learning model, the one or more first inputs identifying the plurality of collaborative documents, and comprising an indication of a request to identify a collaborative document that is most relevant to a first subject discussed during the video conference at a first point in time. The method may further include determining, based on one or more first outputs of the machine learning model, the collaborative document that is the most relevant to the first subject discussed during the video conference at the first point in time, and providing the determined collaborative document for presentation on one or more client devices while the first subject is being discussed during the video conference.

20 Claims, 10 Drawing Sheets

VIDEO CONFERENCE CONTENT AUTO-RETRIEVAL AND FOCUS BASED ON LEARNED RELEVANCE

RELATED APPLICATIONS

This application is a continuation application of U.S. patent application Ser. No. 17/972,515, filed Oct. 24, 2022, which is a continuation of U.S. patent application Ser. No. 16/730,484, filed Dec. 30, 2019, now U.S. Pat. No. 11,484,170, each of which is incorporated herein by reference.

TECHNICAL FIELD

Aspects and implementations of the present disclosure relate to online collaboration using a cloud-based collaboration management platform, and more specifically, relate to video conference content auto-retrieval and focus based on learned relevance.

BACKGROUND

A cloud-based collaboration management platform has expanded a range of online collaborative tools provided over a network to cover media collaboration such as a video conference. The video conference tool allows multiple client devices to be connected over the network and share each other's audio (e.g., voice of a user recorded via a microphone of a client device) and video data (e.g., a video captured by a camera of a client device, or a video captured from a screen image of the client device) for efficient communication. To this end, the video conference tool provides a graphical user interface that includes multiple regions to present the video data of each participating client device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for providing a video stream for presentation during a video conference. In an implementation, audio streams and video streams are received from client devices participating in a video conference. Based on the received audio streams a subject being discussed during the video conference at a point in time is determined. A video stream that is most relevant to the subject being discussed during the video conference at the point in time is determined from the video streams. The video stream determined to be most relevant to the subject being discussed during the video conference at the point is provided to the client devices for presentation on the client devices while the subject is being discussed during the video conference.

In some other implementations, a system and method are disclosed for providing a collaborative document for presentation during a video conference. In an implementation, audio streams are received from client devices participating in a video conference. Based on the audio streams of the video conference, a subject being discussed during the video conference at a point in time is determined. Collaborative documents that each have a user of at least one participating client device as a collaborator are determined. A collaborative document that is most relevant to the subject being discussed during the video conference at the point in time is determined from the collaborative documents. The determined collaborative document is provided for presentation on one or more of the participating client devices while the subject is being discussed during the video conference.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

A cloud-based collaboration management platform provides collaborative tools such as document processing applications, a document storage, an online calendar, messaging applications (e.g., electronic mails and instant messages), among other things. The cloud-based collaboration management platform can also provide a video conference tool that allows collaborators to watch and listen to each other via a graphic user interface (GUI) supported by the video conference tool. Collaborators can also share a document with other collaborators via the GUI.

Such a GUI can include multiple regions to show collaborators participating in a video conference, as well as any documents being presented in the video conference. There may be a main region of the GUI that catches the attention of the participants. The video conference tool may update the GUI to present a current speaker in the main region based on a volume of the current speaker. In addition, the video conference tool may update the GUI to display a document being presented by a participant, in response to receiving a request from the presenter. However, the video conference tool does not consider context (e.g., a subject of discussion) of the video conference when determining how to update the GUI during the video conference. Accordingly, the video conference tool may not be able to focus the attention of the participants on content relevant to the current context of the video conference.

Aspects and implementations of the present disclosure address the above and other deficiencies or problems by determining a video stream, among video streams generated during a video conference, that is the most relevant to a subject being discussed during the video conference at a particular moment and providing the most relevant video stream for presentation as the subject is being discussed during the video conference. Other aspects and implementations of the present disclosure address the above and other deficiencies or problems by determining a collaborative document that has a user participating in a video conference as a collaborator and that is the most relevant to a subject being discussed during the video conference at a particular moment, and then providing the most relevant collaborative document to be presented on participating client devices while the subject is being discussed during the video conference.

Some technical advantages of implementations of the present disclosure include providing an additional functionality to the video conference tool of the cloud-based collaboration management platform that intelligently brings appropriate content to the attention of collaborators participating in a video conference, based on the context of the video conference.

Figure 1:
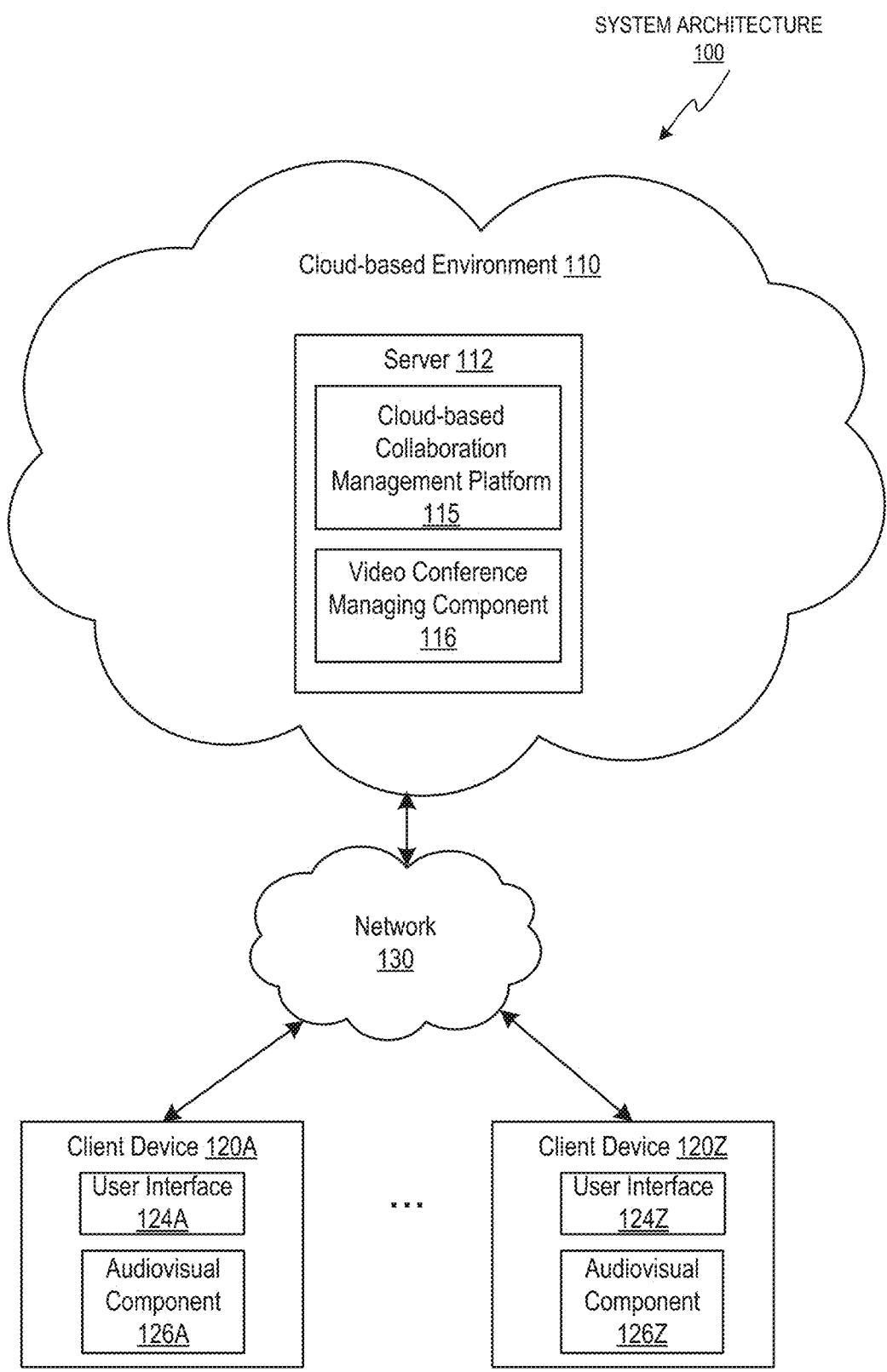
FIG. 1 illustrates an example of a system architecture for implementations of the present disclosure.

FIG. 1 illustrates an example of a system architecture 100 for implementations of the present disclosure. The system architecture 100 includes a cloud-based environment 110 connected to client devices 120A-120Z via a network 130. The cloud-based environment 110 refers to a collection of physical machines that host applications providing one or more collaboration services (e.g., media collaboration (such as a video conference service, an instant messaging service, etc.), document collaboration (such as collaborative word processing, collaborative document hosting, etc.) to multiple client devices 120 via the network 130.

The network 130 may be public networks (e.g., the Internet), private networks (e.g., a local area network (LAN) or wide area network (WAN)), or a combination thereof. The network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, the network 130 may include a wired infrastructure (e.g., Ethernet).

The cloud-based environment 110 may include a server 112 and a data store 114. The server 112 may be represented by one or more physical machines (e.g., server machines, desktop computers, etc.) that include one or more processing devices communicatively coupled to memory devices and input/output (I/O) devices. The server 112 may host a cloud-based collaboration management platform 115. The cloud-based collaboration management platform 115 may be implemented as computer instructions that are executable by one or more processing devices on the server 112. In alternative implementations, the cloud-based collaboration management platform 115 may be installed on the client devices 120A-120Z (e.g., as a standalone application) and operate as peers in a peer-to-peer environment. In yet alternative implementations, applications on the client devices 120A-120Z may interact with the cloud-based collaboration management platform 115 and may perform some of the functionality of the content management platform 115.

The cloud-based collaboration management platform 115 may enable users of the client devices 120A-120Z to collaborate with each other via a video conference, messaging, or a document. Additionally, in some embodiments, the cloud-based collaboration management platform 115 may provide a UI 124A-124Z that enables the users to watch and listen to each other and view any documents while using the video conference service. In an implementation, the cloud-based collaboration management platform 115 can provide the UIs 124A-124Z as web pages rendered by a web browser of the client devices 120A-120Z. In another implementation, the cloud-based collaboration management platform 115 provides the UIs 124A-124Z for presentation by a mobile application or a desktop application. For example, the UIs 124A-124Z may be displayed by a native application executing on the operating system of the user device 120A-120Z. The native application may be separate from a web browser.

In addition to the cloud-based collaboration management platform 115, the server 112 can include a video conference managing component 116. The video conference managing component 116 intelligently manages the presentation of content in a graphical user interface (GUI) during a video conference. In some embodiments, the video conference managing component 116 can determine what should be presented in a main region of the GUI to focus the attention of participants during a video conference. The video conference managing component 116 can identify, among video streams received from client devices of users participating in the video conference, a video stream that is the most relevant to a subject being discussed at a point in time during the video conference. Accordingly, the video conference managing component 116 can cause the identified video stream to be presented in the main region of the GUI.

In some other embodiments, the video conference managing component 116 can identify a collaborative document that is the most relevant to a subject being discussed at a point in time during the video conference. Such a collaborative document can have a user of at least one client devices 120A-120Z as a collaborator of the document. The video conference managing component 116 can cause the identified collaborative document to be presented on the GUI as a suggestion while the subject is being discussed during the video conference. Details of the video conference managing component 116 will be described below with respect to FIG. 2.

The data store 114 of the cloud-based environment 110 may be separate from the server 112 and communicatively coupled to the server 112, or the data store 114 may be part of the server 112. In some embodiments, the data store 114 may reside on the client devices 120A-120Z. Alternatively, the data store 114 may be a distributed data store including multiple repositories, databases, etc. and may store data of various tools for collaboration services, including a video conference application, document applications (e.g., word processor, presentation, and spreadsheet applications), a cloud-based document storage service, an online calendar service, an email service, a messenger, etc. For example, the data store 114 can store portions of audio and video streams received from the client devices 120A-120Z for the video conference application. Moreover, the data store 114 can store a various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 120A-120Z and/or concurrently editable by the users.

The client devices 120A-120Z may include one or more processing devices communicatively coupled to memory devices and I/O devices. The client devices 120A-120Z may be desktop computers, laptop computers, tablet computers, mobile phones (e.g., smartphones), or any suitable computing device. As discussed above, the client devices 120A-120Z may each include a web browser and/or a client application (e.g., a mobile application or a desktop application.) A user may join and participate in a video conference via the UI 124A-124Z provided by the cloud-based collaboration management platform 115 and presented by the web browser or the client application. A user can also present a document to attendees of the video conference via the UI 124A-124Z. The UI 124A-124Z can include multiple regions to present video streams of the client devices 120A-120Z provided to the server 112 for the video conference.

The client devices 120A-120Z can include an audiovisual component 126A-126Z. The audiovisual component 126A-126Z can generate audio and video data to be streamed to the server 112. In one implementation, the audiovisual component 126A-126Z can include a device to capture an audio signal (representing speech of a user), such as a microphone and to generate the audio data based on the captured audio signal. The audiovisual component 126A-126Z can also include a speaker to output the audio data. In addition, the audiovisual component 126A-126Z can include an image capturing device, such as a camera that captures images and generates video data of the captured images.

Figure 2:
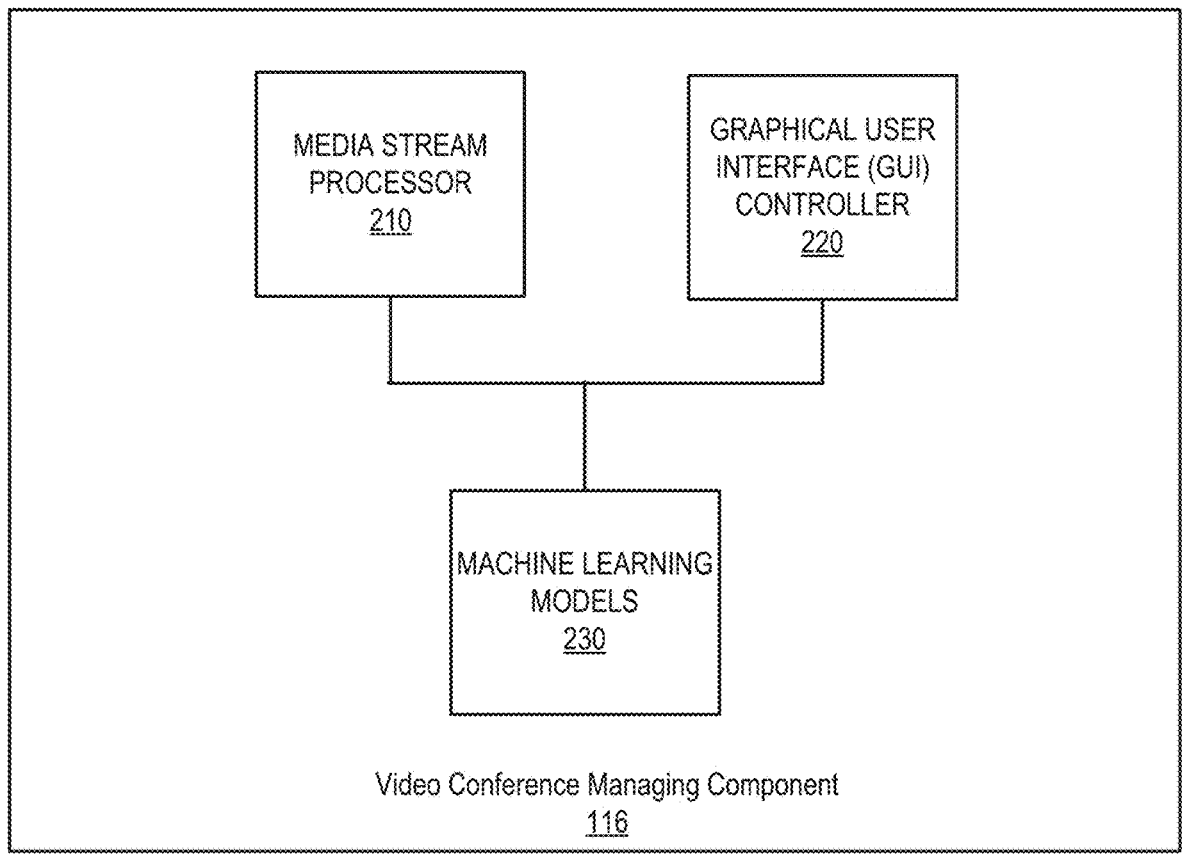
FIG. 2 depicts an example of a video conference managing component, in accordance with some embodiments of the disclosure.

FIG. 2 depicts an example of a video conference managing component 116, in accordance with some embodiments of the disclosure. The video conference managing component 116 includes a media stream processor 210, a graphical user interface (GUI) controller 220, and machine learning models 230. The components can be combined together or separated into further components, according to a particular implementation. It should be noted that in some implementations, various components of the video conference managing component 116 may run on separate machines.

The media stream processor 210 receives audio streams from the client devices and identifies a subject of discussion recorded in audio streams. The media stream processor 210 can also receive video streams from the client devices and determine a video stream that is most relevant to the identified subject of discussion. The media stream processor 210 can determine the most relevant video stream by using one of machine learning models 230 that have been trained by a training engine (not shown). Once the media stream processor 210 has determined the most relevant video stream, the media stream processor 210 can notify the GUI controller 220 of the most relevant video stream. Moreover, the media stream processor 210 can also determine a collaborative document that is most relevant to the identified subject of discussion by using another machine learning model 230 that has been trained by a training engine based on the audio streams. In another embodiment, the machine learning model 230 for the collaborative document can be trained based on the audio streams as well as video streams (e.g., based on video data captured by camera or captured from screen images of a respective client device). Such a collaborative document can have a user of at least one client device as a collaborator of the document. Once the media stream processor 210 has determined the most relevant collaborative document, the media stream processor 210 can notify the GUI controller 220 of the most relevant collaborative document.

The GUI controller 220 controls the GUI for a video conference. The GUI can include a main region and multiple thumbnail regions. Each region can present a video stream. The GUI controller 220 can control which video stream to be presented by providing a command to the client devices that indicates which video stream to be presented in which region of the GUI (along with the received video and audio streams being provided to the client devices). For example, in response to being notified of the video stream that is most relevant to a subject at a point in time of the video conference, the GUI controller 220 can transmit a command causing that most relevant video stream to be presented in the main region of the GUI.

Moreover, in response to being notified of a collaborative document that is most relevant to the subject being discussed in the video conference, the GUI controller 220 can generate a notification message suggesting the collaborative document that is relevant to the subject of the discussion. Subsequently, the GUI controller 220 can provide the notification message to the client device for presentation on the GUI during the video conference.

The machine learning models 230 can be trained by a training engine based on training data to enable the machine learning models 230 to determine (e.g., predict) a video stream and a collaborative document that are the most relevant to a subject being discussed during a video conference at a point in time. For example, during the training patterns in training data (including training input and target output) that map the training input to the target output (i.e., the answer to be predicted) can be identified and then used by the machine learning models 230 to provide relevant predictions.

Such a machine learning model 230 can correspond to a model artifact that is created by the training engine that uses training data (e.g., training inputs and corresponding target outputs (i.e., correct answers for respective training inputs)). The machine learning model 230 may be composed of, e.g., a single level of linear or non-linear operations (e.g., a support vector machine [SVM] or may be a deep network (i.e., a machine learning model 230 that is composed of multiple levels of non-linear operations.) An example of a deep network is a neural network with one or more hidden layers, and such a machine learning model 230 may be trained by, for example, adjusting the weights of a neural network in accordance with a backpropagation learning algorithm or the like. Further details about the training of the machine learning models 230 are described below with respect to FIGS. 4-5.

Figure 3A:
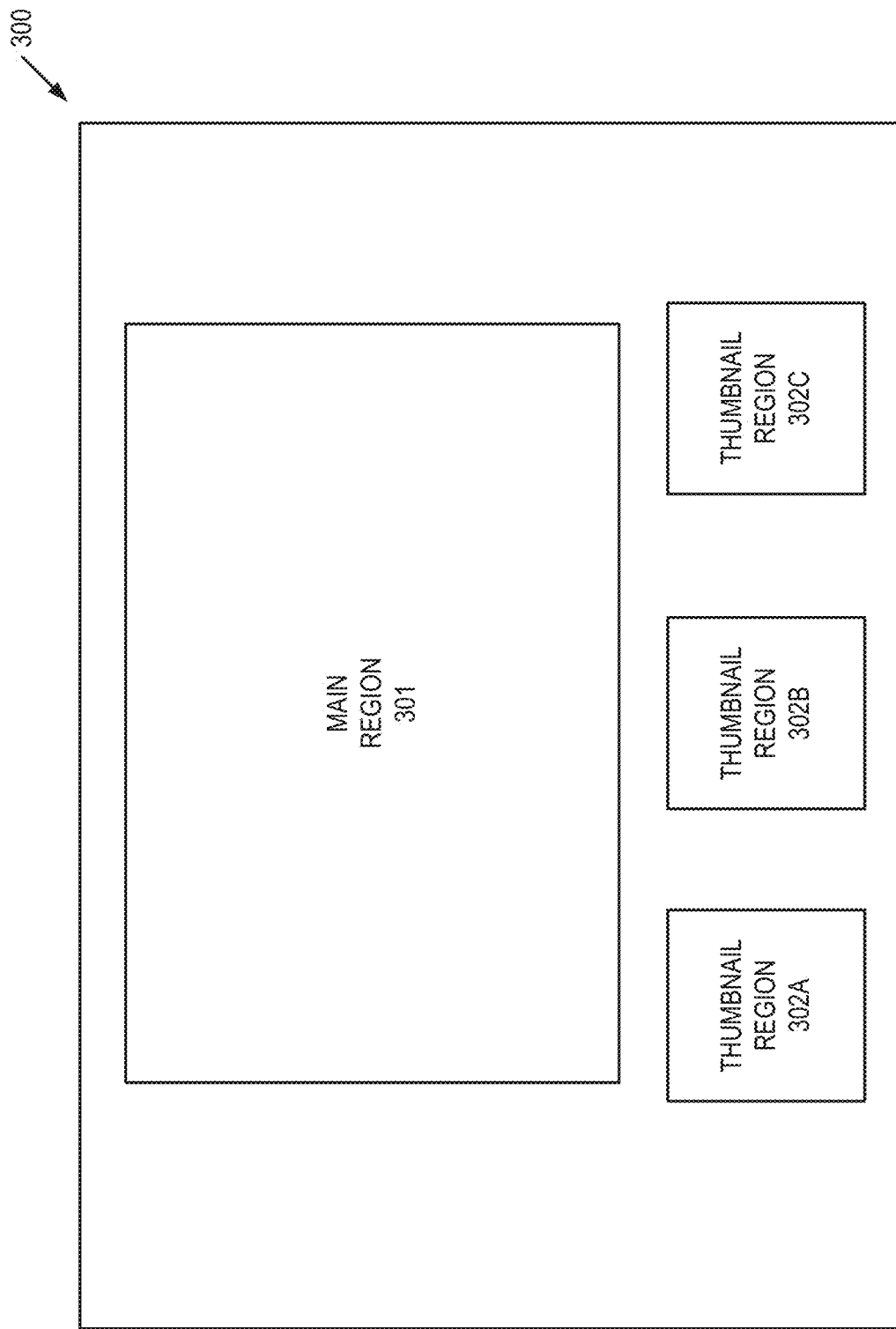
FIG. 3A illustrates an example graphical user interface (GUI) of a video conference in accordance with some embodiments of the present disclosure.

FIG. 3A illustrates an example graphical user interface (GUI) 300 of a video conference in accordance with some embodiments of the present disclosure. The GUI 300 may be generated by the video conference managing component 116 of FIG. 1 for presentation at a user interface (e.g., the user interface 124A-124Z) of the client devices. Accordingly, the GUI 300 may be generated by one or more processing devices of the server 112 of FIG. 1.

In one implementation, the GUI 300 can include a main region 301 and thumbnail regions 302A-302C. A main region 301 corresponds to an area in the GUI 300 and is placed at or near the center of the GUI 300. In one implementation, the main region 301 is relatively bigger than thumbnail regions 302A-302C to catch the attention of attendees (e.g., users of the client devices). In another implementation, there may be more than one main regions 301.

The main region 301 can present images of a video stream. In one implementation, the video conference managing component 116 or the processing device of the server 112 can associate the main region 301 with a video stream received from the client devices. For example, the processing device can determine that the main region 301 is to show images from a particular video stream. In other words, the main region 301 can present an image of the associated video stream at a particular point in time. In a further implementation, the processing device can associate the main region 301 with a video stream (e.g., a video stream of a presentation document, a video stream of a current speaker, etc.) that is determined to be the most relevant to a subject being discussed in the video conference at a particular point in time. This can be done automatically without any user input specifying which video stream is the most relevant one.

The processing device can change the video stream currently associated with the main region 301 to a different video stream that is more relevant to a subject or a topic of discussion in the video conference at the moment. Accordingly, the main region 301 can present the most relevant video stream to the attendees.

A thumbnail region 302A-302C corresponds to an area of the GUI 300 that is located along a side (e.g., a bottom side) of the GUI 300. Similar to the main region 301, the thumbnail region 302A-302C is also associated with a video stream received from the client device and presents the video stream. However, the thumbnail region 302A-302C spans a smaller area than the main region 301, thereby presenting images of the associated video stream in a relatively smaller scale than the main region 301.

In some implementations, the GUI 300 can additionally present a notification message of a collaborative document overlaid on an image of a video stream. Details about the notification message will be discussed below with respect to FIG. 3E. The GUI 300 can also include a chat region for participating users of the client devices 120A-120Z to collaborate using chat messages. The client devices can receive and transmit chat messages to the participating users. The GUI 300 can also include an options region for providing selectable options to adjust display settings (a size of the main region 301 and thumbnail regions 302A-302C, a number of main regions 301, a selection of a video stream of the main region 301) and volume settings, invite additional users to participate, etc.

Figure 3B:
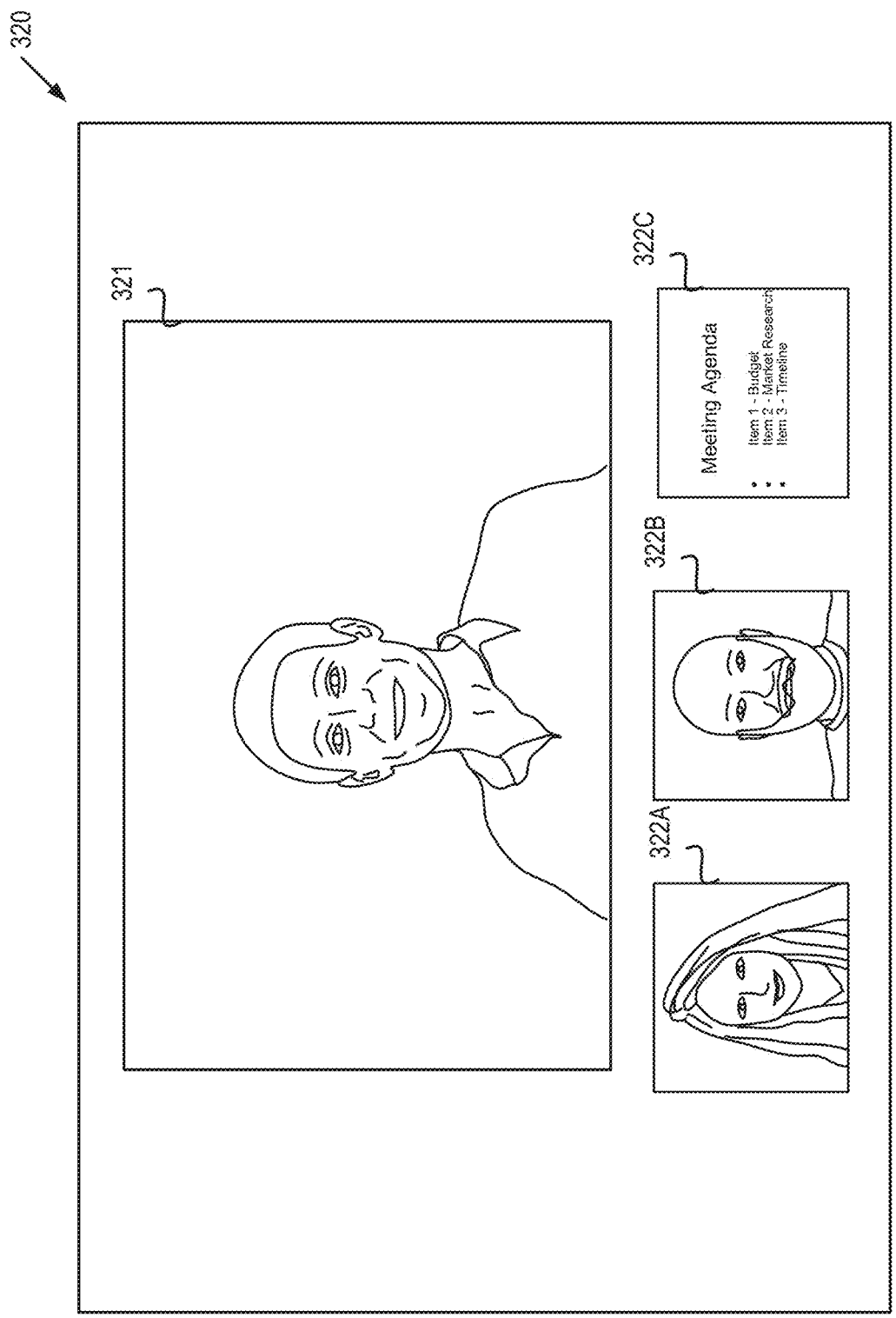
FIG. 3B illustrates another example GUI of a video conference in accordance with some embodiments of the present disclosure.

FIG. 3B illustrates another example graphical user interface (GUI) 320 of a video conference in accordance with some embodiments of the present disclosure. The GUI 320 can be presented to the client devices at the start of a video conference. Each region (a main region 321, thumbnail regions 322A-322C) of the GUI 320 can present a video stream received from the client devices. For example, the processing device can receive video streams of video conference attendees as they are captured by an audiovisual component (e.g., a camera) of a client device. In addition, the processing device can receive a video stream of a presentation document. A presentation document can be a slide presentation, a word document, a spreadsheet document, a web page, or any other document that can be presented. In one implementation, a client device can open a presentation document using an appropriate document application and share the screen of the opened presentation document with client devices of the other attendees by providing a video stream of the presentation document. As illustrated, the processing device can determine to present a video stream of "Aaron" in a main region 321, a video stream of "Betty" in a thumbnail region 322A, a video stream of "Chris" in a thumbnail region 322B, and a video stream of the "Meeting Agenda" document in a thumbnail region 322C shared by a client device of Aaron.

In the beginning of the video conference, Aaron, Betty and Chris can talk about the weather. Based on transcription generated from audio streams received along with the video streams from the client devices, the processing device can determine that a subject or a topic of the video conference at the moment is the weather. Subsequently, the processing device can determine that none of the video streams (no images of the video streams at the moment) is sufficiently relevant to the current subject-weather. For example, as will be further described below with respect to FIG. 4, the processing device can determine whether relevance (e.g., a ranking generated by a trained machine learning model) of the video streams are above a threshold relevance in order to be determined as being sufficiently relevant. In case no video streams exceed the threshold relevance, the processing device can determine that a video stream of a current speaker (e.g., Aaron) should be presented in the main region 321 as a default.

When Aaron says, "Ok, so let's talk about today's agenda," the processing device can determine that the subject has now been changed from weather to an agenda (based on the transcription of the corresponding audio stream). In response, the processing device can determine, from the content of the video streams at or around the time Aaron made the statement, which video stream is the most relevant to the new subject (e.g., agenda) being discussed at the moment. In one implementation, the processing device can determine whether the current video stream (e.g., the video stream of Aaron) presented in the main region 321 is sufficiently relevant to the new subject by using a threshold value and a relevance ranking technique as will be described in detail below with respect to FIG. 4.

In case the processing device determines that the video stream of Aaron is not the most relevant video stream to the new subject (or relevance of the video stream of Aaron does not exceed the threshold value), the processing device can present a different video stream that is most relevant to the new subject (e.g., agenda). For example, by using the trained machine learning model, the processing device can determine that the video stream of the "Meeting Agenda" document is the most relevant to the new subject, agenda, based on the content of the "Meeting Agenda" document video stream at or around the point in time Aaron made the statement. Accordingly, the processing device can update the GUI 320 to be the GUI 330 of FIG. 3C. That is, the processing device can cause a video stream presenting the "Meeting Agenda" document to be displayed in the main region 322 and the video stream of Aaron to be presented in a thumbnail region 322C.

Figure 3C:
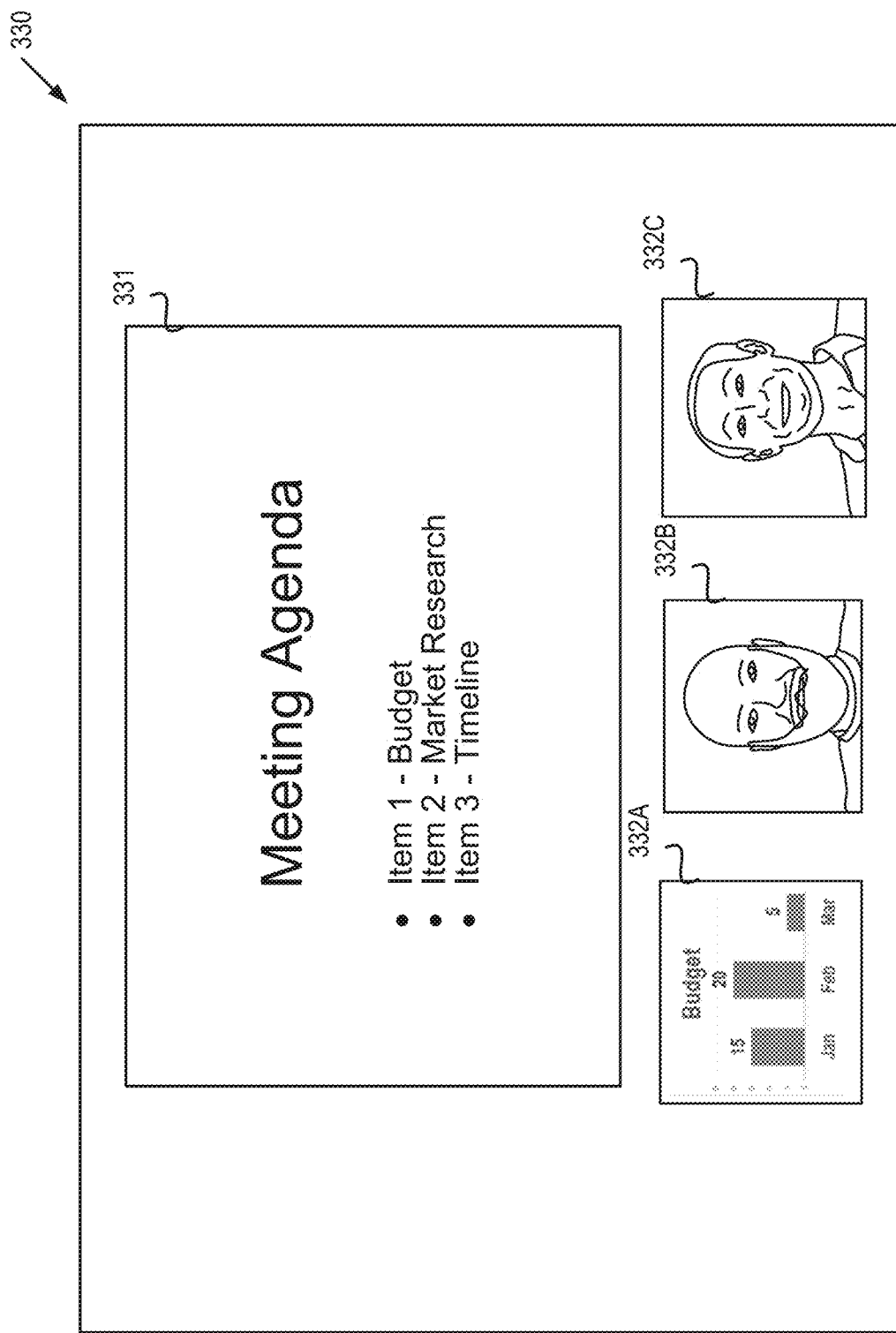
FIG. 3C illustrates another example GUI of a video conference in accordance with some embodiments of the present disclosure.

FIG. 3C illustrates another example graphical user interface (GUI) 330 of a video conference in accordance with some embodiments of the present disclosure. To continue from the example described in FIG. 3B, the GUI 330 presents the "Meeting Agenda" document video stream in a main region 331. Furthermore, a thumbnail region 332A presents a video stream for a "Budget" document, a thumbnail region 332B continues to present the video stream of Chris, and a thumbnail region 332C presents the video stream of Aaron, as will be described below.

As the processing device has determined that the "Meeting Agenda" document video stream is most relevant to the subject (e.g., agenda) being discussed at the moment, the processing device associates the main region 331 with the "Meeting Agenda" document video stream, as illustrated. The processing device can present the GUI 330 to the participating client devices while Aaron introduces today's agenda. That is, although Aaron is the current speaker, the "Meeting Agenda" document is presented in the main region 331 because there is a video stream (e.g., the "Meeting Agenda" document video stream) that is more relevant to the current subject (e.g., agenda) than the video stream of Aaron. Rather, the video stream of Aaron is presented in the thumbnail region 332C. Moreover, while Aaron still introduces the agenda, Betty can share a document to be discussed for the first item ("Budget") of the agenda. The "Budget" document is shown in the thumbnail region 332A.

Figure 3D:
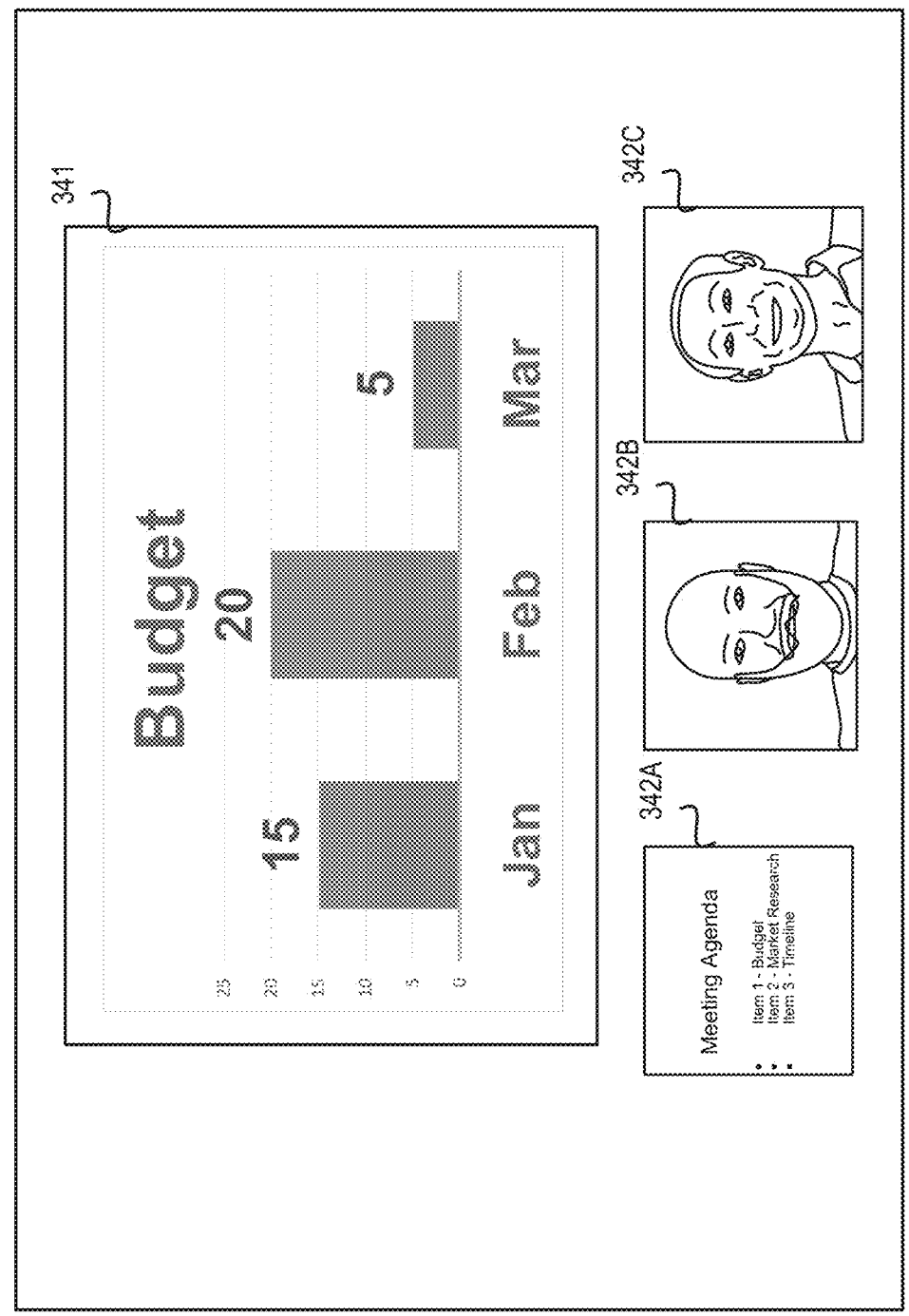
FIG. 3D illustrates another example GUI of a video conference in accordance with some embodiments of the present disclosure.

FIG. 3D illustrates another example graphical user interface (GUI) 340 of a video conference in accordance with some embodiments of the present disclosure. As continued from the example described in FIG. 3C, the GUI 340 presents the video stream for the "Budget" document in a main region 341, the "Meeting Agenda" document video stream in a thumbnail region 342A, the video stream of Chris in a thumbnail region 342B, and the video stream of Aaron in a thumbnail region 34C, as will be described below.

While Aaron, Betty, and Chris discuss the first item ("Budget") on the agenda, the processing device can determine that the current subject of the discussion is the budget. Subsequently, the processing device can determine that the video stream of the "Budget" document is more relevant to the current subject than the "Meeting Agenda" document video stream based on the content of the two document video streams. Accordingly, instead of showing the "Meeting Agenda" document video stream in the main region 341, the processing device can update the GUI 340 to show the "Budget" document video stream in the main region 341 and the "Meeting Agenda" document video stream in the thumbnail region 342A—while the thumbnail region 342B-342C continues to present the same video stream. As such, the processing device can identify which document stream contains content that is most relevant to the subject being discussed at or around the current point in time. This can be done automatically without any user input specifying that this document is the most relevant one.

Figure 3E:
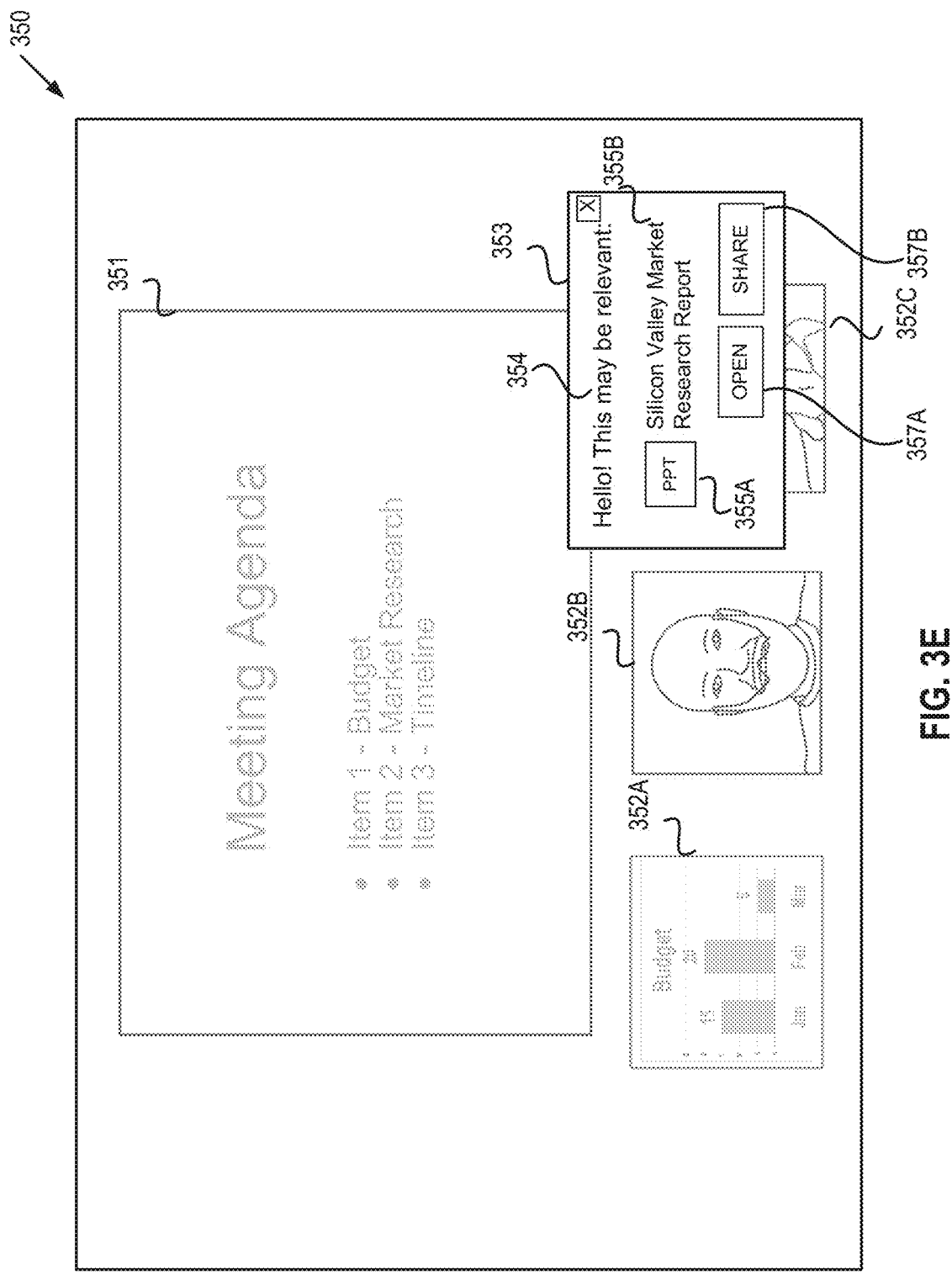
FIG. 3E illustrates another example GUI of a video conference in accordance with some embodiments of the present disclosure.

FIG. 3E illustrates another example graphical user interface (GUI) 350 of a video conference in accordance with some embodiments of the present disclosure. To continue from the example described in FIG. 3D, the GUI 350 includes a main region 351 presenting the "Meeting Agenda" document video stream, a thumbnail region 352A presenting the "Budget" document video stream, a thumbnail region 352B presenting the video stream of Chris, and a thumbnail region 352C presenting the video stream of Aaron. In addition, the GUI 350 can present a notification message 353, as will be described below.

As Aaron, Betty, and Chris finish discussing the first item (e.g., budget) and proceeds to the next item ("Item 2—Market Research") in the agenda (e.g., Aaron can say, "Now, let's move on to the next item in the agenda, the Market Research"), the processing device can determine that the subject of the video conference is changed back to the agenda. Accordingly, the processing device can determine that the "Meeting Agenda" document video stream is the most relevant video stream in a similar manner described above. Subsequently, the processing device can update the GUI 350 to present the "Meeting Agenda" document video stream in the main region 351 and the "Budget" document video stream back to the thumbnail region 352A. This can be done automatically without any user input specifying that this document is the most relevant one.

Aaron, Betty, and Chris can talk about a market research in the Silicon Valley in particular (e.g., Betty can say, "Does anyone remember what the market research was like for the Silicon Valley?"). Based on the transcription of Betty's audio stream, the processing device can determine that the current subject being discussed is Silicon Valley Market Research. Accordingly, the processing device can query collaborative documents having any of Aaron, Betty, and Chris as a collaborator and identify a document that is most relevant to the current subject. Details about determining the most relevant document to the current subject are described below with respect to FIG. 5. In another implementation, the processing device can determine whether the video streams (e.g., document video streams) being received from the client devices contain content that is sufficiently relevant to the current subject by using a threshold value and a relevance ranking technique as will be described in detail below with respect to FIG. 4. In one implementation, in response to determining that the video streams are not sufficiently relevant to the current subject, the processing device can proceed to search a data store of the collaborative documents in order to identify the most relevant document.

The processing device can determine a collaborative document entitled, "Silicon Valley Market Research Report" having Chris as a collaborator to be most relevant to the current discussion. In response, the processing device can present the document via a notification message 353, as illustrated. The processing device can present the notification message 353 as an overlay on the GUI 350 (e.g., showing the notification message 353 on the top of the main region 351 and the thumbnail regions 352A-352C). In one implementation, the processing device can provide the notification message 353 to the GUI 350 of a user associated with the document (as a collaborator) of the notification message 353. In this example, the processing device can provide the GUI 350 including the notification message 353 to a client device associated with Chris.

The notification message 353 can include a message text 354, a document identifier 355A-355B, and interactive buttons 357A-357B. The message text 354 can indicate the most relevant collaborative document (e.g., "Hello! This may be relevant:"). The document identifier 355A-355B can identify the collaborative document using a document icon 355A and a title 355B of the document. The document icon 355A can illustrate a file type of the collaborative document (e.g., ppt, doc, xls, html, processing device f). The interactive buttons 357A-357B enables a respective collaborator (e.g., Chris) to access the collaborative document. The open button 357A can cause the document to be opened at the client device of the respective user (e.g., Chris) and to be provided as a video stream for the video conference. On the other hand, the share button 357B can cause the document to be shared with other attendees (e.g., Aaron and Betty) of the video conference.

Figure 4:
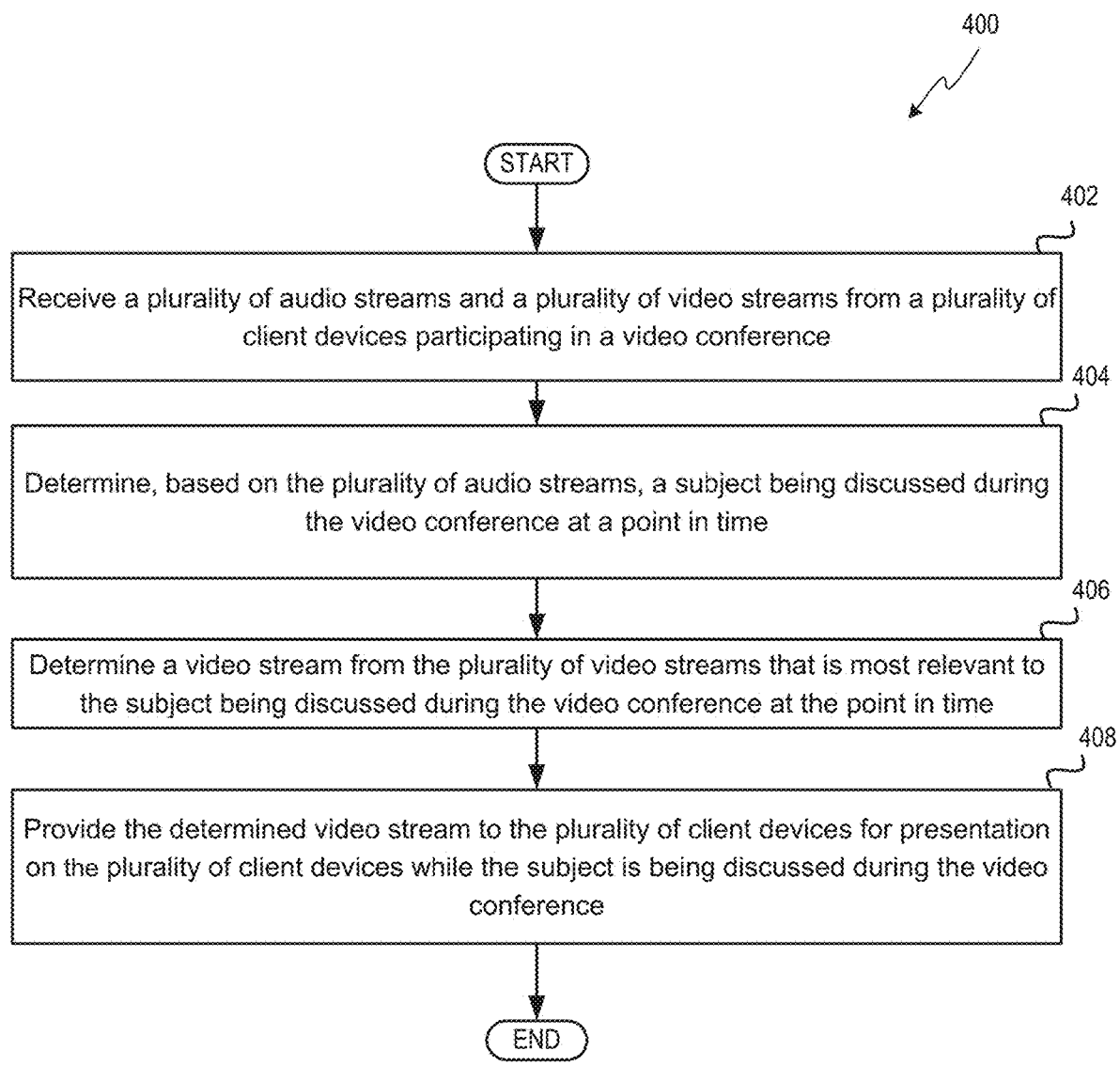
FIG. 4 depicts a flow diagram of a method for providing a video stream for presentation during a video conference, in accordance with some embodiments of the present disclosure.

FIG. 4 depicts a flow diagram of a method 400 for providing a video stream for presentation during a video conference, in accordance with some embodiments of the present disclosure. The method 400 may be performed by the video conference managing component 116 of FIG. 1. The method 400 may be executed by one or more processing devices of the server 112. The method 400 may be carried out for each client device 120A-120Z of the cloud-based collaboration management platform 115.

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices.

At operation 402, the processing device receives audio streams and video streams from client devices (e.g., client devices 120A-120Z of FIG. 1) participating in a video conference. The processing device can receive the streams of data over one or more channels dedicated for a video conference service provided by the cloud-based collaboration management platform. An audio stream can correspond to audio data collected by a microphone of a client device and subsequently encoded (e.g., compressed and packetized) for transmission over a network. The audio data can be encoded according to a standard such as MP3, etc. The audio stream can also include metadata that indicates a type of data (e.g., audio).

A video stream (hereinafter, also referred to as a camera video stream) can correspond to a series of images captured by a camera of a client device and subsequently encoded for transmission over a network in accordance with, for example, H.264 standard. In addition, the video stream (hereinafter, also referred to as a document video stream) can correspond to screen image data of a presentation document as shown on a display device of a client device. A presentation document can be a slide presentation, a word document, a spreadsheet document, a web page, or any other document that can be presented.

The processing device can receive such a document video stream as a separate video stream from the camera video stream. In one implementation, the processing device can receive the document video stream via a separate channel. Similar to the audio stream, the video stream (either the camera or document video stream) can include metadata indicating a type of data (e.g., a video or text). In some embodiments, the processing device can receive the audio and video streams as a composite stream. The composite stream is also referred to as a multiplex stream where segments of the audio and video streams are intermixed together. The processing device can also receive metadata indicating types of data (e.g., an audio, a video, a text document, etc.) included in the composite stream among other information.

At operation 404, the processing device determines, based on the received audio streams, a subject being discussed during the video conference at a point in time. In one implementation, the processing device can generate transcription of the received audio streams. For example, the processing device can decode the received audio streams and extract audio data that corresponds to sound recorded by a microphone at the respective client device. The audio data can represent speech (e.g., spoken words) and/or background noise. The processing device can perform speech recognition or automatic transcription operation on the audio data. Such a speech recognition is a technique to identify and translate spoken language into text. For example, the processing device can use the Viterbi algorithm, dynamic time warping, or a neural network, among other things to transcribe conversations captured by the audio data. The processing device can periodically generate the transcription while receiving the audio streams from client devices.

Based on the transcription data (e.g., the text data), the processing device can determine a subject being discussed during the video conference at or around the point in time. In one implementation, the processing device can perform topical analysis on the transcription data to determine a topic or subject discussed at a particular point in time (or, over a period of time including the particular point in time). In other implementations, the processing device can use other techniques detecting one or more keywords in the transcription data and infer a subject being discussed based on redundancy or similarity of the keywords. The processing device can also determine the point in time (e.g., a beginning or ending time of a segment of the audio streams transcribed) or a period of time (e.g., the beginning time to the ending time of the audio segment) associated with the transcribed audio streams used in determining the subject of discussion.

In another embodiment, at operation 404, the processing device can determine a subject being discussed during the video conference at a point in time, based on the received video streams in addition to or alternative to the received audio streams. The processing device can identify any objects represented in the video streams at the point in time as a subject of the video conference by using an image recognition technique as will be described below. In one implementation, the processing device can identify objects other than the attendees, for example, an object displayed on a presentation slide, as the subject of the video conference.

At operation 406, the processing device determines a video stream from the video streams that is most relevant to the subject being discussed during the video conference at that point in time. In some embodiments, the processing device can determine the most relevant video stream only amongst a particular type of a video stream, such as document video streams. The processing device can identify the type of the video stream based on a channel the respective video stream is received from, or based on metadata included in the video stream. In another implementation, the processing device can determine the type of the video stream based on the content of the video stream (as will be described below). In some other embodiments, the processing device can determine the most relevant video stream amongst all video streams received from the client devices.

In order to determine the video stream that is most relevant to the subject being discussed during the video conference at that point in time, the processing device can first decode the received video streams and extract video data (comprising a series of images) that corresponds to images captured by a camera at the respective client device.

The processing device can extract the video data at or around the point in time associated with the determined subject of the video conference. In case of decoding the document video stream, the extracted video data can correspond to video data (comprising a series of images) of a presentation document as shown on a display device of the respective client device.

The processing device can rank video streams based on relevance of a respective video stream at the point in time to the subject being discussed during the video conference at the point in time by using a trained machine learning model. The trained machine learning model corresponds to a machine learning model that is trained based on training data including training input data (e.g., transcription of audio streams and images of video streams from client devices participated in other video conferences, etc.) and target output data (e.g., indication of whether video streams at a point in time is relevant to a subject being discussed at the point in time during other video conferences). Further details of how a machine learning model is trained will be described below.

The processing device can provide, as an input to the trained machine learning model, transcription of the audio streams (e.g., transcription generated in determining the subject at operation 404) and the extracted video data of the video streams at or around the point in time associated with the determined subject of operation 404. In another implementation, the processing device can additionally provide the subject determined at operation 404 as the input.

Yet in another implementation, the processing device can also provide, as the input to the trained machine learning model, content identified from a document video stream at or around the point in time associated with the determined subject of operation 404. For example, the processing device can perform an image recognition technique on a portion (an image or a series of images) of the document video stream at or around the point in time associated with the determined subject of operation 404. In one implementation, the processing device can perform an optical character recognition (OCR) and identify any texts (e.g., words) represented in the portion of the document video stream. As an example, the portion of the document video stream can be an image of a presentation document, the "Meeting Agenda," as illustrated in FIG. 3B. By using the OCR technique, the processing device can identify the content as, "Meeting Agenda", "Item 1—Budget", "Item 2—Market Research", and "Item 3—Timeline". As an alternative or in addition, the processing device can use an object recognition technique in identifying the content of the portion of the document video stream. For example, the processing device can analyze a portion of a document video stream showing a girl holding a cat. The processing device can identify the content as a human (or a girl) and an animal (or a cat).

In response to providing the input to the trained machine learning data, the processing device can obtain rankings of the video streams (associated with the extracted video data provided as the input). Such a ranking can represent a probability of the respective video stream (at or around the point in time associated with the determined subject of operation 404) being relevant to the determined subject of operation 404. The ranking can be, for example, a numerical value between 0 to 1.

For example, as illustrated in FIG. 3D, Aaron, Betty, and Chris discuss the first item ("Budget") on the agenda, the processing device can determine that the subject of the discussion is the budget at the moment (e.g., 3:30 pm). The processing device can provide the transcription of what Aaron, Betty, and Chris discussed at or a period of time (5 minutes) around the moment and extracted video data of video streams of the "Budget" document and "Meeting Agenda" document to the trained machine learning model. Subsequently, the processing device can received as output from the trained machine learning model, rankings of the video streams of the "Budget" document, "Meeting Agenda" document, Chris, and Aaron. For example, the ranking of the "Budget" document video stream can be '0.9' and the "Meeting Agenda" document video stream '0.5'. As another example, the processing device can additionally provide extracted video data of video streams of "Chris" and "Aaron" as input to the trained machine learning model.

Based on the rankings of video streams obtained from the trained machine learning model, the processing device can determine the video stream from the video streams that is most relevant to the subject being discussed during the video conference at that point in time. In one implementation, the processing device can determine the video stream having the highest ranking to be most relevant to the subject being discussed at the point in time of operation 404. For example, referring back to FIG. 3D example, the processing device can determine the "Budget" document video stream to be the most relevant video stream to the subject (e.g., budget) being discussed at the moment (e.g., 3:30 pm) because the ranking of the "Budget" document video stream is the highest (e.g., 0.9).

In one embodiment, a training engine can be provided to train a machine learning model. The training engine may find patterns in training data (including training input and target output) that map the training input to the target output (i.e., the answer to be predicted) and provide the machine learning model that captures these patterns under supervised learning. Such a machine learning model may be composed of, e.g., a single level of linear or non-linear operations (e.g., a support vector machine [SVM] or may be a deep network (i.e., a machine learning model that is composed of multiple levels of non-linear operations.) An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network.

Examples of training inputs can include transcription of audio streams and video data of video streams at various points in time from client devices (e.g., in the same group of client devices as the current video conference or different groups) participating in past video conferences. In another implementation, the processing device can provide, as training inputs, audio streams instead of transcription of audio streams at various points in time during the past video conferences. Yet in another implementation, the training inputs can also include identified content of the video streams and/or a subject of discussion at various points in time during the past video conferences.

The corresponding target outputs can include an indication as to whether each of the video streams of the training inputs is either relevant or not relevant to a subject of discussion at various points of time during the past video conferences.

In one implementation, the training engine may improve or further train the trained machine learning model based on feedback collected while the machine learning model is being used as a part of the video conference service provided by the cloud-based collaboration management platform. An example of such feedback can be a request to switch what is being presented in the main region of the GUI received from the client devices participating in the video conference with another content. Based on the feedback, the training engine can adjust the weights of the neural network of the trained machine learning model for refinement.

At operation 408, the processing device provides the video stream determined (at operation 406) to be most relevant to the subject to the client devices for presentation on the client devices while the subject is being discussed during the video conference. In one implementation, the processing device can determine whether a current subject remains to be the same subject determined at operation 404. For example, the processing device can determine the current subject based on transcription of audio stream at or around the current point in time using the same technique described above with respect to operation 404. The processing device can determine that the current subject is different from the subject of operation 404 (i.e., a subject has been changed to a different subject) using a similarity measure, such as a distance metric or cosine similarity.

Once the processing device determines that the subject has not changed, the processing device can provide the video stream determined at operation 406 to the participating client devices to be presented on a main region of the GUI for the video conference. On the other hand, in response to determining a change in the subject at another point in time, the processing device can determine whether the video stream provided for the presentation (e.g., in the main region) is still most relevant to the changed subject. In one implementation, the processing device can use the trained machine learning model, in a similar manner as described above, to determine how relevant the video stream currently presented in the main region is to the new subject being discussed in the video conference at this point in time. For example, the processing device can provide transcription of audio streams and video data of video streams currently being received (and identified content of the video streams and the new subject) as an input to the trained machine learning model. The processing device can determine that the video stream being presented in the main region of the GUI remains to be most relevant in case the ranking of the video obtained as output of the trained machine learning model is the highest.

In another implementation, the processing device can utilize a threshold value to determine whether the current video stream of the main region remains to be sufficiently relevant. For example, if the current video stream (e.g., the "Budget" document video stream of FIG. 3D) of the main region has a ranking that is above 0.6, the processing device can determine that the video stream is still the most relevant to the new subject (e.g., agenda)—even if, for example, the ranking for the "Meeting Agenda" document video stream is higher than the ranking of the "Budget" document video stream.

On the other hand, in case the processing device determines that the current video stream of the main region is not the most relevant to the new subject (e.g., does not have the highest ranking or below the threshold value), the processing device can determine another video stream that has the highest ranking to be most relevant to the new subject. Subsequently, the processing device can provide that video stream for presentation on the participating client devices while the changed subject is still being discussed during the video conference (as illustrated in FIG. 3E, the "Meeting Agenda" document video stream is now presented in the main region 351 of the GUI 350).

In another implementation, in response to determining that the video stream provided for the presentation is no longer most relevant to the changed subject, the processing device can cause a video stream of a current speaker to be presented on the main region of the GUI while the changed subject is being discussed during the video conference. Furthermore, the processing device can determine that none of the video streams is sufficiently relevant (e.g., has a ranking below a threshold value (e.g., 0.5) to a subject being discussed at a point in time during the video conference. In such a case, the processing device can cause the video stream of a current speaker to be presented in the main region of the GUI for the video conference as illustrated in FIG. 3A.

Figure 5:
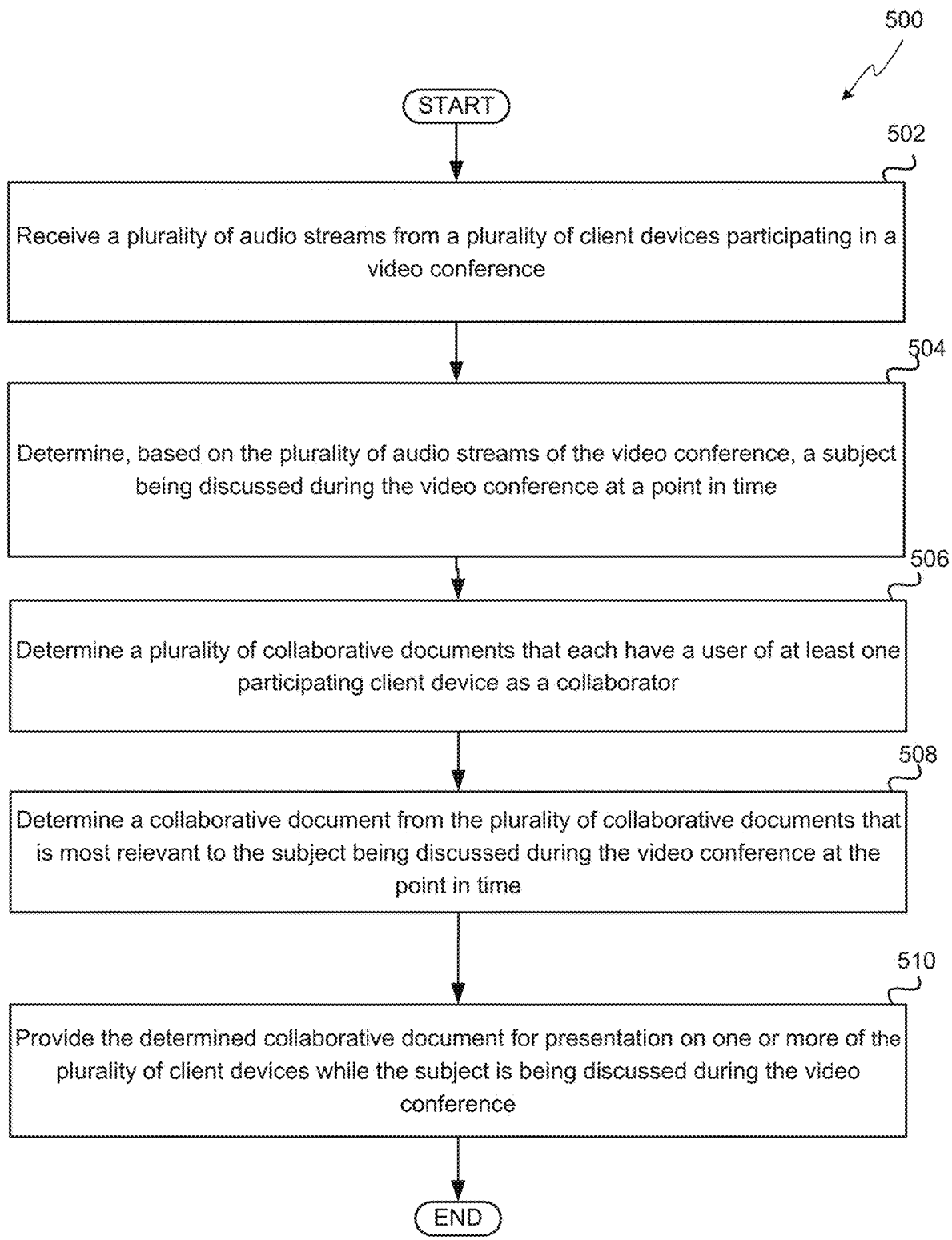
FIG. 5 depicts a flow diagram of a method for providing a collaborative document for presentation during a video conference, in accordance with some embodiments of the present disclosure.

FIG. 5 depicts a flow diagram of a method 500 for providing a collaborative document for presentation during a video conference, in accordance with some embodiments of the present disclosure. The method 500 may be performed by the video conference managing component 116 of FIG. 1. The method 500 may be executed by one or more processing devices of the server 112. The method 500 may be carried out for each client device 120A-120Z of the cloud-based collaboration management platform 115.

For simplicity of explanation, the method 500 of this disclosure is depicted and described as a series of acts. However, acts in accordance with this disclosure can occur in various orders and/or concurrently, and with other acts not presented and described herein. Furthermore, not all illustrated acts may be required to implement the method 500 in accordance with the disclosed subject matter. In addition, those skilled in the art will understand and appreciate that the method 500 could alternatively be represented as a series of interrelated states via a state diagram or events. Additionally, it should be appreciated that the method 500 disclosed in this specification are capable of being stored on an article of manufacture (e.g., a computer program accessible from any computer-readable device or storage media) to facilitate transporting and transferring such method to computing devices.

At operation 502, the processing device receives audio streams from client devices participating in a video conference. Similar to operation 402, the processing device can receive the audio streams via one or more channels dedicated for a video conference service provided by the cloud-based collaboration management platform. Moreover, such audio streams can correspond to encoded audio data that is generated by a microphone of a respective client device. The audio data can be encoded according to a standard such as MP3, etc. The audio stream can also include metadata that indicates a type of data (e.g., audio).

At operation 504, the processing device determines, based on the audio streams of the video conference, a subject being discussed during the video conference at a point in time. In one implementation, the processing device can generate transcription of the audio streams as described with respect to operation 404 using a speech recognition technique. The processing device can determine the subject being discussed during the video conference at the point in time based on the transcription. For example, the processing device can perform topical analysis to identify the subject being discussed. Furthermore, the processing device can determine the point in time (e.g., a beginning or ending time of a segment of the audio streams transcribed) or a period of time (e.g., the beginning time to the ending time of the audio segment) associated with the transcribed audio streams used in determining the subject of discussion. In another embodiment, the processing device can determine the subject of the video conference based on the received video streams in addition to, or alternative to the audio streams as described with respect to operation 404.

At operation 506, the processing device determines collaborative documents that each have a user of at least one participating client device as a collaborator. The processing device can query a data store associated with the cloud-based collaboration management platform (e.g., the Cloud-based collaboration management platform 115 of FIG. 1) for documents associated with at least one user identifiers associated with the participating client devices. In one implementation, the processing device can identify documents having a corresponding user as a collaborator (e.g., a reader or editor) of the document based on an access right of the document assigned to the user.

At operation 508, the processing device determines a collaborative document from the plurality of collaborative documents that is most relevant to the subject being discussed during the video conference at that point in time. In one implementation, the processing device can rank the collaborative documents from operation 506, based on relevance of a respective collaborative document to the subject being discussed during the video conference at the point in time by using a trained machine learning model.

The trained machine learning model corresponds to a machine learning model that is trained based on training data including training input data and target output data. In one implementation, training input data can include transcription of audio streams from client devices participated in past video conferences and collaborative documents (e.g., text) each having a user of at least one of the client devices. In another implementation, the training input data can further include identifying information of the collaborative documents such as title, keywords, tags, etc. Yet in another implementation, the training input data can also include a subject being discussed at various points in time of the past video conferences. In another embodiment, the training input data can additionally include video streams (e.g., video streams of video data captured by a camera, or captured from screen images of client devices.)

The training output data can include an indication of whether the respective collaborative document is most relevant to a subject being discussed at the point in time during the past video conferences. Details of how a machine learning model is trained are described above.

The processing device can provide, as an input to the trained machine learning model, transcription of the audio streams (e.g., transcription generated in determining the subject at operation 504) and the collaborative documents determined from operation 506. In another implementation, the processing device can additionally provide the identifying information of the collaborative documents such as title, keywords, tags, etc. as the input. In another embodiment, the processing device can additionally provide the received video streams as the input. In response to providing the input to the trained machine learning model, the processing device can obtain rankings of the collaborative documents. Such a ranking can represent a probability of the respective collaborative document being relevant to the determined subject of operation 504. The ranking can be a numerical value between 0 to 1.

Based on rankings of the collaborative documents, the processing device can determine the collaborative document from the collaborative documents that is most relevant to the subject being discussed during the video conference at that point in time. In one implementation, the processing device can determine a collaborative document to be the most relevant in case of determining that a ranking of the collaborative document is above a threshold value (e.g., 0.7) and has the highest ranking.

At operation 510, the processing device provides the determined collaborative document for presentation on one or more of the participating client devices while the subject is being discussed during the video conference. In one implementation, the processing device can provide the most relevant collaborative document only to a client device (e.g., a client device a user has used to log into the cloud-based collaboration platform) associated with a user who is a collaborator of the most relevant collaborative document.

The processing device can provide the most relevant collaborative document to the client device(s) via a notification message (e.g., the notification message 353 of FIG. 3E) on a GUI for the video conference. The notification message can suggest the collaborative document to be opened (e.g., by presenting the open button 357A of FIG. 3E).

On the other hand, in response to determining that the rankings of the collaborative documents do not satisfy a threshold condition (e.g., a ranking should be over 0.7), the processing device can provide a video stream associated with a current speaker of the video conference for presentation on the client devices while the subject is being discussed during the video conference.

Figure 6:
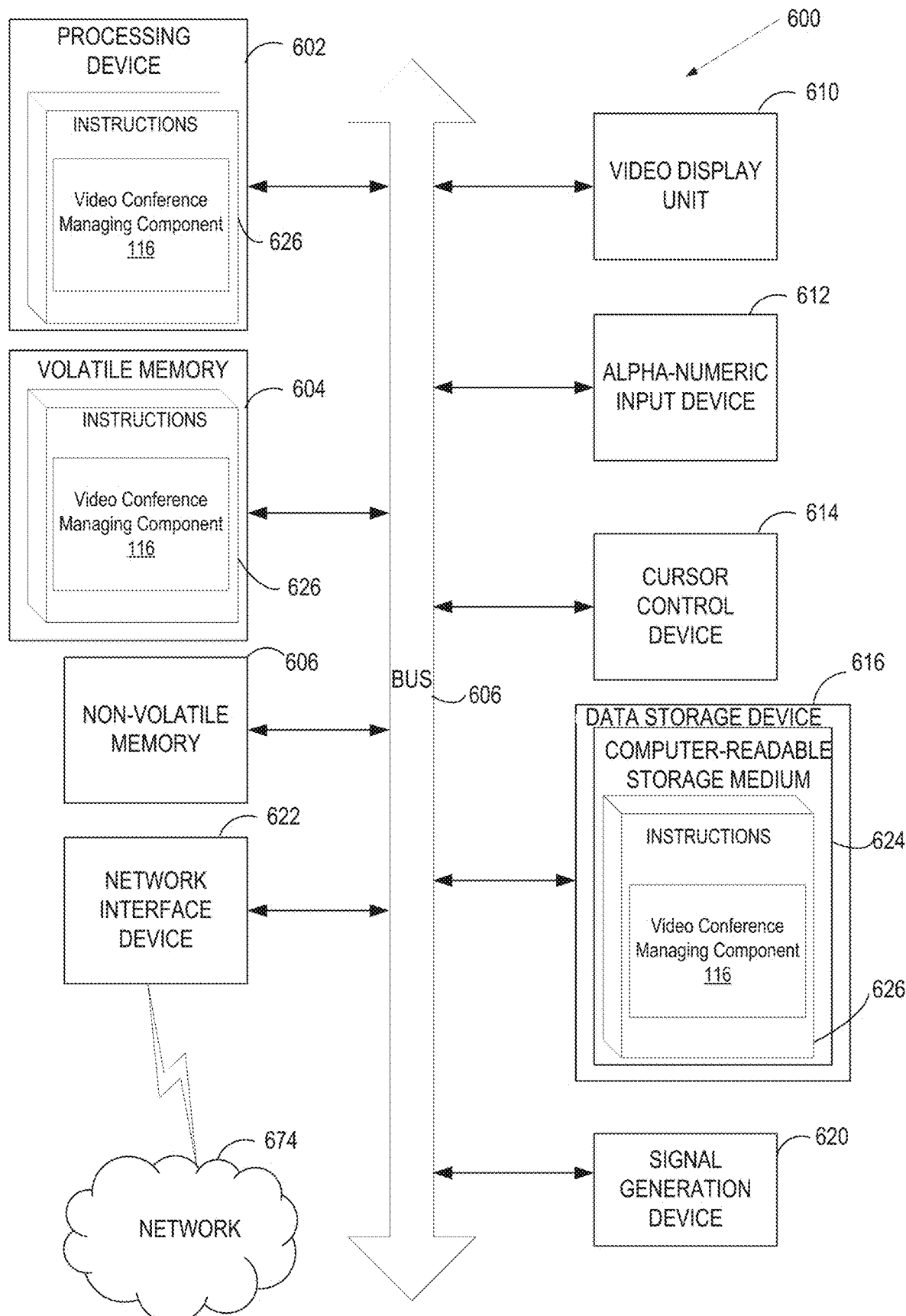
FIG. 6 depicts a block diagram of an example computing system operating in accordance with one or more aspects of the present disclosure

FIG. 6 depicts a block diagram of an example computing system 600 operating in accordance with one or more aspects of the present disclosure. In various illustrative examples, computer system 600 may correspond to any of the computing devices within system architecture 100 of FIG. 1. In one implementation, the computer system 600 may be a server 112. In another implementation, the computer system 600 may be each of the client devices 120A-120Z, 210A-210Z, 260A-260Z.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing the video conference managing component 116 of FIG. 1 for implementing the methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "providing", "presenting", "ranking", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the systems and methods described herein collect personal information about users, or may make use of personal information, the users may be provided with an opportunity to control whether programs or features collect user information (e.g., information about a user's social network, social actions or activities, profession, name, or gender). Moreover, in situations in which the systems and methods described herein collect information about what the users said and presented during a video conference, the users may be provided with an opportunity to control whether programs or features collect such information. Also, certain data may be treated in one or more ways before it is stored or used, so that personal identifiable information is removed. For example, a user's identity may be treated so that no personal identifiable information can be determined for the user. Thus, the user may have control over how information is collected about the user and/or used.

What is claimed is:

1. A method comprising:
   determining a plurality of collaborative documents each associated with at least one user of at least one of a plurality of client devices participating in a video conference;
   providing one or more first inputs to a machine learning model, the one or more first inputs identifying the plurality of collaborative documents, and comprising an indication of a request to identify a collaborative document that is most relevant to a first subject discussed during the video conference at a first point in time;
   determining, based on one or more first outputs of the machine learning model, the collaborative document that is the most relevant to the first subject discussed during the video conference at the first point in time;
   providing the determined collaborative document for presentation on one or more of the plurality of client devices while the first subject is being discussed during the video conference; and
   responsive to determining, at a second point in time during the video conference, that the first subject has changed to a second subject:
      determining, based on one or more second outputs of the machine learning model, that none of the plurality of collaborative documents is relevant to the second subject discussed during the video conference at the second point in time; and
      providing, for presentation on the plurality of client devices while the second subject is being discussed during the video conference, a media stream associated with a current speaker of the video conference.

2. The method of claim 1, further comprising:
   receiving a first plurality of media streams of the plurality of client devices participating in the video conference, the first plurality of media streams associated with the first point in time; and
   generating a transcription of an audio component of each of the first plurality of media streams in relation to the first point in time.

3. The method of claim 2, further comprising:
   determining the first subject being discussed during the video conference at the first point in time based on generated transcriptions of audio components of the first plurality of media streams; and
   providing the first subject as an additional input to the machine learning model that is trained to identify a collaborative document that is most relevant to a subject provided as input to the machine learning model.

4. The method of claim 3, wherein the first subject is determined based on topical analysis of the generated transcriptions.

5. The method of claim 3, wherein the machine learning model is trained based on training data comprising information identifying collaborative documents presented during past video conferences, and subjects discussed at various points in time during the past video conferences.

6. The method of claim 2, further comprising:
   providing the generated transcriptions as additional input to the machine learning model that is trained to determine a subject based on transcriptions provided as input to the machine learning model, and to also to identify a collaborative document that is most relevant to a determined subject.

7. The method of claim 1, wherein the machine learning model is trained based on training data comprising transcriptions corresponding to a third plurality of media streams from past video conferences, and information identifying collaborative documents presented during the past video conferences.

8. The method of claim 1, wherein each of the plurality of collaborative documents has a user of one of the plurality of client devices as a collaborator and is determined based on access rights assigned to users of the plurality of client devices with respect to the plurality of collaborative documents.

9. The method of claim 1, wherein the one or more first outputs of the machine learning model comprise rankings of the plurality of collaborative documents, wherein each ranking indicates a probability of a respective document being relevant to the first subject.

10. The method of claim 1, wherein providing the determined collaborative document for presentation on one or more of the plurality of client devices comprises:
    providing, for presentation on one or more of the plurality of client devices, a video conference user interface (UI) including a suggestion pertaining to the determined collaborative document; and
    upon receiving an indication of an acceptance of the suggestion, providing a media stream associated with a presentation of the document in the video conference UI on the plurality of client devices while the first subject is being discussed during the video conference.

11. A non-transitory computer-readable medium comprising instructions, which when executed by a processing device cause a processing device to perform operations comprising:
    determining a plurality of collaborative documents each associated with at least one user of at least one of a plurality of client devices participating in a video conference;
    providing one or more first inputs to a machine learning model, the one or more first inputs identifying the plurality of collaborative documents, and comprising an indication of a request to identify a collaborative document that is most relevant to a first subject discussed during the video conference at a first point in time;
    determining, based on one or more first outputs of the machine learning model, the collaborative document that is the most relevant to the first subject discussed during the video conference at the first point in time;
    providing the determined collaborative document for presentation on one or more of the plurality of client devices while the first subject is being discussed during the video conference; and
    responsive to determining, at a second point in time during the video conference, that the first subject has changed to a second subject:
       determining, based on one or more second outputs of the machine learning model, that none of the plurality of collaborative documents is relevant to the second subject discussed during the video conference at the second point in time; and providing, for presentation on the plurality of client devices while the second subject is being discussed during the video conference, a media stream associated with a current speaker of the video conference.

12. The non-transitory computer-readable medium of claim 11, the operations further comprising:
receiving a first plurality of media streams of the plurality of client devices participating in the video conference, the first plurality of media streams associated with the first point in time; and
generating a transcription of an audio component of each of the first plurality of media streams in relation to the first point in time.

13. The non-transitory computer-readable medium of claim 12, the operations further comprising:
determining the first subject being discussed during the video conference at the first point in time based on generated transcriptions of audio components of the first plurality of media streams; and
providing the first subject as an additional input to the machine learning model that is trained to identify a collaborative document that is most relevant to a subject provided as input to the machine learning model.

14. The non-transitory computer-readable medium of claim 13, wherein the machine learning model is trained based on training data comprising information identifying collaborative documents presented during past video conferences, and subjects discussed at various points in time during the past video conferences.

15. The non-transitory computer-readable medium of claim 12, the operations further comprising:
providing the generated transcriptions as additional input to the machine learning model that is trained to determine a subject based on transcriptions provided as input to the machine learning model, and to also to identify a collaborative document that is most relevant to a determined subject.

16. A system comprising:
a memory; and
a processing device, coupled to the memory, to perform operations comprising:
determining a plurality of collaborative documents each associated with at least one user of at least one of a plurality of client devices participating in a video conference;
providing one or more first inputs to a machine learning model, the one or more first inputs identifying the plurality of collaborative documents, and comprising an indication of a request to identify a collaborative document that is most relevant to a first subject discussed during the video conference at a first point in time;
determining, based on one or more first outputs of the machine learning model, the collaborative document that is the most relevant to the first subject discussed during the video conference at the first point in time;
providing the determined collaborative document for presentation on one or more of the plurality of client devices while the first subject is being discussed during the video conference; and
responsive to determining, at a second point in time during the video conference, that the first subject has changed to a second subject:
determining, based on one or more second outputs of the machine learning model, that none of the plurality of collaborative documents is relevant to the second subject discussed during the video conference at the second point in time; and
providing, for presentation on the plurality of client devices while the second subject is being discussed during the video conference, a media stream associated with a current speaker of the video conference.

17. The system of claim 16, the operations further comprising:
receiving a first plurality of media streams of the plurality of client devices participating in the video conference, the first plurality of media streams associated with the first point in time; and
generating a transcription of an audio component of each of the first plurality of media streams in relation to the first point in time.

18. The system of claim 17, the operations further comprising:
determining the first subject being discussed during the video conference at the first point in time based on generated transcriptions of audio components of the first plurality of media streams; and
providing the first subject as an additional input to the machine learning model that is trained to identify a collaborative document that is most relevant to a subject provided as input to the machine learning model.

19. The system of claim 18, wherein the machine learning model is trained based on training data comprising information identifying collaborative documents presented during past video conferences, and subjects discussed at various points in time during the past video conferences.

20. The system of claim 16, wherein providing the determined collaborative document for presentation on one or more of the plurality of client devices comprises:
providing, for presentation on one or more of the plurality of client devices, a video conference user interface (UI) including a suggestion pertaining to the determined collaborative document; and
upon receiving an indication of an acceptance of the suggestion, providing a media stream associated with a presentation of the document in the video conference UI on the plurality of client devices while the first subject is being discussed during the video conference.

\* \* \* \* \*